United States Patent [19]

Frederiksen et al.

[11] 3,753,012

[45] Aug. 14, 1973

[54] CIRCUIT FOR PROVIDING PRECISE TIME DELAY

[75] Inventors: Thomas M. Frederiksen, San Jose, Calif.; William F. Davis, Tempe, Ronald W. Russell, Mesa, both of Ariz.

[73] Assignee: Motorola, Inc., Franklin Park, Ill.

[22] Filed: Feb. 17, 1972

[21] Appl. No.: 227,166

[52] U.S. Cl. .................. 307/293, 307/228, 307/235, 307/268, 328/129

[51] Int. Cl. .................. H03k 5/13

[58] Field of Search .................. 307/228, 235, 268, 307/293; 328/129

[56] References Cited

UNITED STATES PATENTS

| | | | |
|---|---|---|---|
| 3,297,883 | 1/1967 | Schulmeyer et al. | 307/228 |
| 3,577,012 | 5/1971 | Dummermuth | 307/228 X |
| 3,558,924 | 1/1971 | Lindell | 307/228 X |

*Primary Examiner*—John Zazworsky
*Attorney*—Foorman L. Mueller et al.

[57] ABSTRACT

Integrated circuit structure responsive to being triggered to produce output signals at precise time intervals following points in the operation of a device. The circuit is adapted for accurate repeating operation, and provides a plurality of signals at different precise time delays. A discrete capacitor is discharged to a predetermined value (reset) by a voltage regulator at each triggering of the circuit, and at the end of a short time starts to charge so that the voltage thereacross forms a repeatable exponential ramp. A plurality of comparators are coupled to the capacitor and each produces an output when the capacitor voltage reaches the reference voltage for that comparator. The triggering may be provided by a circuit including a reset capacitor which responds to the change of levels of a signal derived from the device to alternately charge and discharge the reset capacitor. The voltage across the reset capacitor is applied to a pair of comparators which produce current pulses during the beginning of the charge and discharge periods of the reset capacitor for operating the voltage regulator.

11 Claims, 2 Drawing Figures

CIRCUIT FOR PROVIDING PRECISE TIME DELAY

BACKGROUND OF THE INVENTION

There are many applications in which it is desired to provide timed times intervals following the occurrence of some condition in the operation of a device. In internal combustion engines, for example, it is important that fuel be introduced into the cylinder, and that the spark be provided at very precisely controlled times in relation to the rotation of a shaft which is coupled to the piston within the cylinder. In fuel injection systems, the fuel injector valves for the cylinder must be accurately controlled over a wide range of engine speeds. It is also desired that this timing be provided electronically rather than mechanically, and that the apparatus involved be compact and inexpensive.

It is common practice to use the charge and/or discharge of a capacitor to provide timed intervals or periods. In order to provide accurate timing, the capacitor must be reset to a precise initial voltage at the beginning of each timing interval. The capacitor must be brought to this initial voltage rapidly so that any error in the reset time will be small with respect to the time delay to be provided. Also, the voltage ramp provided by charge of the capacitor must be accurately repeated for each time period.

SUMMARY OF THE INVENTION

It is an object of the present invention to provide a precise time delay generator that is of simple and inexpensive construction and which provides precise timing accuracy over a wide temperature range.

Another object of the invention is to provide a time delay generator adapted to be triggered for rapidly repeating operation, and which provides a plurality of precise time delays following each triggering action.

A further object of the invention is to provide a time delay generator which utilizes a descrete resistor and capacitor to provide an accurate exponential voltage sweep or ramp, and an integrated circuit coupled thereto for initiating the sweep and deriving time intervals therefrom.

A still further object of the invention is to provide a time delay generator wherein the time delays provided are very accurately duplicated from one unit to another.

Still another object of the invention is to provide a time delay generator particularly adapted for use with an internal combustion engine for providing signals at precisely controlled time delays following predetermined points in the cycle of the engine, and wherein the time delays are very accurately the same following each point.

The invention is directed to a time delay generator which includes a discrete resistor and capacitor providing a sweep or ramp voltage, and an integrated circuit coupled to the capacitor for returning the same to a fixed initial voltage. The integrated circuit includes a flip-flop circuit triggered by some external device, such as the distributor shaft or other moving part of an internal combustion engine. Reed switches may be coupled to the shaft for triggering the flip-flop at two points in the rotation of the shaft. The output of the flip-flop controls a circuit for alternately charging a reset capacitor to a given voltage level and discharging the same. The voltage across the reset capacitor is applied to first and second comparators, the first of which produces an output pulse when the voltage increases from its minimum value to one half its maximum value, and the second producing an output pulse when the voltage falls from its maximum value to one half its maximum value. The alternate pulses are applied to a voltage regulator to render the same operative for the duration of the pulses. The voltage regulator is connected to the discrete capacitor, which is charged through the discrete resistor at an exponential rate. The voltage regulator, when rendered operative, rapidly discharges the capacitor to a fixed initial voltage. At the end of the pulse applied to the regulator, the capacitor charges at the exponential rate to provide a ramp voltage which is accurately repeated. The ramp voltage across the capacitor is applied to a plurality of comparators each of which has a reference voltage of a different value greater than the initial voltage of the capacitor. The comparators provide outputs at precisely accurate time delays after the ramp producing capacitor is reset. The time delays provided at the two points of rotation are very accurately the same, and the time delays are very accurately the same from one time delay generator to another.

DETAILED DESCRIPTION

Figures 1, 2:
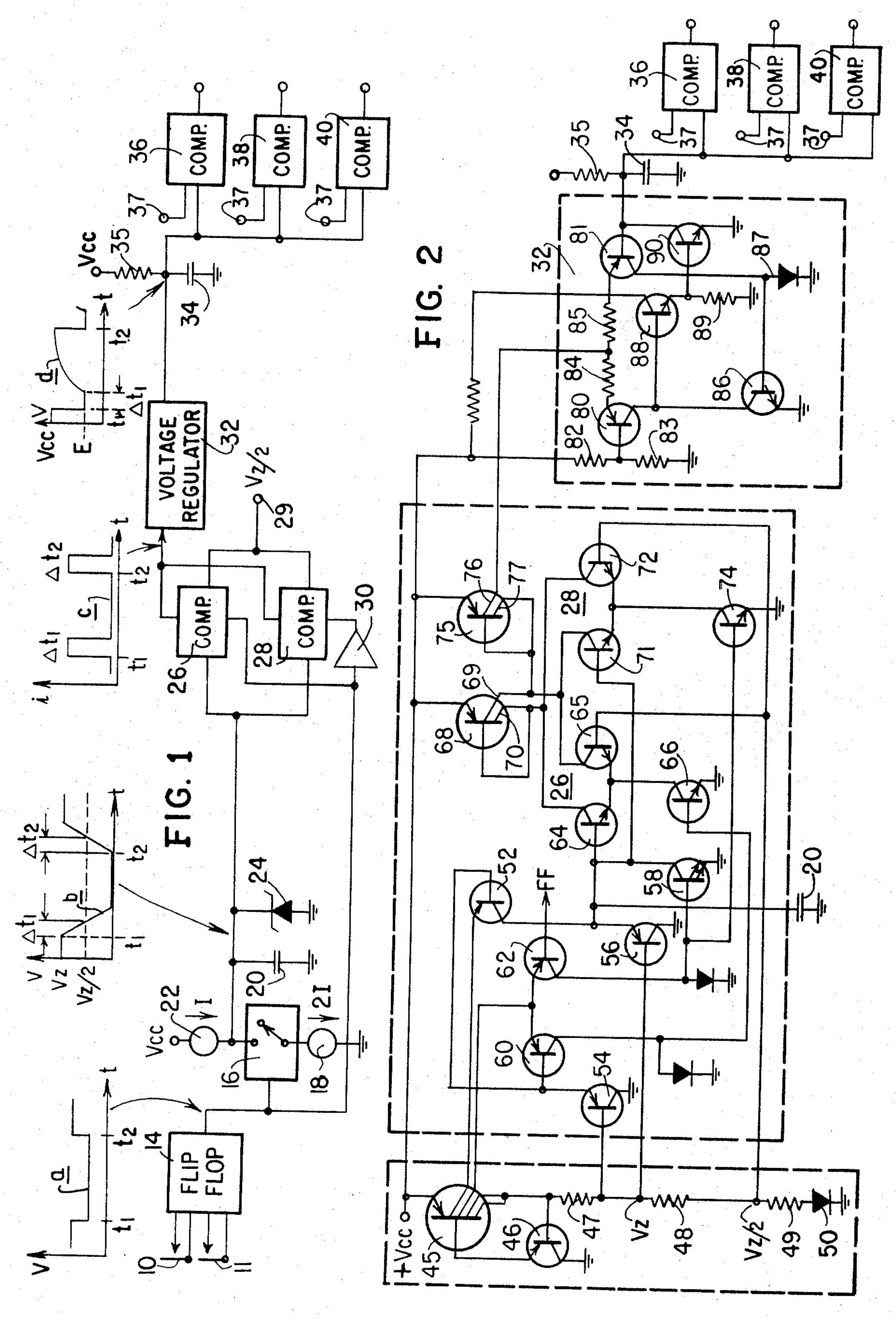
FIG. 1 is a block diagram of the time delay generator of the invention showing waveforms produced therein.
FIG. 2 is a circuit diagram of the time delay generator.

Referring now to the drawings, in FIG. 1 there is shown in block diagraam form the timing system of the invention. As previously stated, the system may be used with an internal combustion engine and may be triggered by the rotation of a shaft of the engine, such as the distributor shaft. For example, a magnet may be provided on the distributor shaft which actuates reed switches 10 and 11 at 180 degree points in the rotation. The reed switches 10 and 11 are connected to flip-flop 14 to cause the same to produce an output signal as shown by waveform *a*. The output signal falls at time $t_1$, which may be the point of operation of switch 10, and rises at time $t_2$, which may be the point of operation of switch 11. The waveform will continue with the points $t_1$, $t_2$, $t_1$, $t_2$ etc. occurring at 180° points of rotation of the shaft. The time between the two adjacent points will vary depending upon the speed of the shaft.

The output of the flip-flop 14 is applied to switch 16 which selectively connects current path 18 to reset capacitor 20. The capacitor 20 is charged when the switch 16 is open by a current I through current path 22. The capacitor 20 will charge to a voltage at which zener diode 24 conducts, which will be referred to as the voltage Vz. When switch 16 is closed, the current path 18 will discharge capacitor 20. This current path 18 is constructed to carry twice the current I passed through path 22, or 2I, so that it will carry the current through path 22 and draw a like amount of current from the capacitor 20 to discharge the same.

Waveform *b* shows the voltage across the capacitor 20. At time $t_1$ the capacitor has been charged to the voltage Vz of the zener diode 24. At the time the switch 16 is closed, the capacitor 20 discharges as shown by the down ramp of waveform *b*. The capacitor remains discharged until the time $t_2$, at which time switch 16 opens. Capacitor 20 will then charge through the current path 22 to the voltage Vz.

The voltage across capacitor 20 is applied to comparators 26 and 28. A voltage equal to one half of Vz is applied from terminal 29 as the reference voltage to the comparators. The flip-flop 14 is also coupled to the comparators to render the same operative, with the flip-flop being directly coupled to comparator 26, and being coupled to comparator 28 through inverter 30. Comparator 28 is rendered operative at time $t_1$ by the flip-flop 14 and produces an output pulse until the voltage on capacitor 20 drops to Vz/2. This is shown by the period $\Delta t_1$ on waveform *b*, and the output is shown as the pulse $\Delta t_1$ on waveform *c*. Comparator 26 will be rendered operative at time $t_2$ by the signal from flip-flop 14 and will produce an output until the voltage on capacitor 20 reaches Vz/2. This is shown as the time interval $\Delta t_2$ in waveform *b*, and as the pulse $\Delta t_2$ on waveform *c*.

The pulses $\Delta t_1$ and $\Delta t_2$ are applied to the voltage regulator 32 to render the same operative. The voltage regulator is connected to the capacitor 34 which is charged through resistor 35. The voltage regulator, when rendered operative, will rapidly discharge the capacitor 34 to a voltage E which is shown on waveform *d*. The voltage regulator remains operative for the duration of pulse $\Delta t_1$, which is long enough to eliminate the dielectric storage in the capacitor 34. At the end of the pulse $\Delta t_1$, capacitor 34 will charge exponentially from the Vcc applied through resistor 35. This is shown by waveform *d*. The timing pulses $\Delta t_1$ and $\Delta t_2$ may have durations of the order of 100 microseconds, for example.

Connected to capacitor 34 are three comparators 36, 38 and 40. A reference voltage is applied to each of the comparators at the terminal 37 thereof, with the reference voltages being different for different time delays. Each reference voltage must be at some level above the voltage E, and below the voltage Vcc applied to the resistor 35. When the voltage across the capacitor reaches the reference voltage applied to one of the comparators, that comparator will provide an output. This output will be in a precisely timed relation with respect to the time $t_1$ (or $t_2$) which triggers the voltage regulator 32 through action of the flip-flop 14. The length of the timing pulse $\Delta t_1$ (or $\Delta t_2$), during which the voltage regulator 32 is rendered operative, may be small compared to the time delays to be produced so that variations in the timing pulses will have a small effect on the time delays produced. Inasmuch as resistor 35 and capacitor 34 are discrete elements, they may have very small initial tolerances and temperature coefficients, so that the time delays do not vary substantially with temperature. The resulting time delay generator has provided good repeatability with an error of less than 1 percent from one unit to another and over a wide temperature range.

FIG. 2 shows the circuit diagram of circuits used in the system of FIG. 1. This includes the circuit for charging the reset capacitor 20, the comparators for producing the pulses for operating the voltage regulator, and the voltage regulator. The required regulated voltages are provided by the multiple collector transistor 45 and transistor 46, and the voltage divider including resistors 47, 48 and 49, and diode 50, which are connected from Vcc to ground. The voltage divider is constructed to provide the voltage Vz at the junction of resistors 47 and 48, and the voltage Vz/2 at the junction between resistors 48 and 49.

The charging path for reset capacitor 20 is provided by one collector of transistor 45, and the emitter-collector path of transistor 52. The current through transistor 52 is controlled by transistor 54, the base electrode of which is connected to the junction between resistors 47 and 48. Transistor 56 has its base electrode connected to the point Vz and its emitter connected to the capacitor 20, and prevents the capacitor 20 from charging above this voltage. This operation is equivalent to that provided by zener diode 24 in the system of FIG. 1. The discharge of capacitor 20 is provided through transistor 58 which is controlled by the differential amplifier including transistors 60 and 62. The base electrode of transistor 62 is connected to the triggering device, such as flip-flop 14 of FIG. 1. Accordingly, when the voltage applied to the base of transistor 62 exceeds the voltage Vz, transistor 62 will conduct to apply a potential to the base of transistor 58 to render the same conducting to discharge capacitor 20. Transistor 58 is shown with two emmiters to represent a transistor having an emitter area two times that of transistors 52 and 62, so that the discharge current through transistor 58 is two times the charge current through transistor 52, as described in connection with FIG. 1. A voltage will, therefore, be developed across capacitor 20 as shown by waveform *b* of FIG. 1. The charge and discharge ramps developed across capacitor 20 are highly symmetrical as the current source transistor 45 is cascaded with transistors 52 and 62 to obtain a high output impedance, and to produce an equal base current error which is subtracted from the currents in the collectors of transistors 52 and 62. The discharge current through transistor 58 will be the current in the collector of transistor 62 multiplied by 2.

The comparator 28 in FIG. 2 is formed by transistors 71 and 72 which have their common emitters connected to ground through transistor 74. Transistor 74 is turned on at time $t_1$ by the action of the flip-flop, through the differential amplifier including transistors 60 and 62. The collector current for transistor 71 is supplied by the collector 69 of multiple collector transistor 68 and the collector 77 of multiple collector transistor 75, and the collector current for transistor 72 is supplied by collector 70 of transistor 68. The amount of current which flows is controlled by transistor 74. The base of transistor 71 is connected to reset capacitor 20, and the base of transistor 72 is connected to the point on the voltage divider between resistors 48 and 49 providing the voltage Vz/2. Current is supplied to the collector of transistor 71 from the collector 69 of transistor 68 at the point when transistor 74 is turned on. This current turns off at the switching point, and current is supplied to the collector of transistor 71 from the collector 77 of transistor 75. The current drawn from collector 77 of transistor 75 by comparator 28 provides a current pulse during the time $\Delta t_1$ when the voltage on capacitor 20 falls from the value Vz to the value Vz/2, as has been described and illustrated in connection with FIG. 1.

The comparator 26 is formed by transistors 64 and 65 which have their common emitters connected to ground through transistor 66. Transistor 66 is rendered conducting by the voltage from the flip-flop through action of the differential amplifier including transistors 60 and 62. Current is supplied to the collector of transistor 64 from collector 70 of transistor 68, and to the collector of transistor 65 from collector 69 of transistor 68 and collector 77 of transistor 75. The base of transistor 64 is connected to reset capacitor 20, and the base of transistor 65 is connected to the voltage Vz/2 point on the voltage divider. The comparator 26 will therefore operate as described in connection with FIG. 1 to provide a current pulse during the time periods that the voltage across reset capacitor 20 rises from the value of Vz to the value of Vz/2, as shown by the pulse $\Delta t$ on waveform *c* (FIG. 1).

The comparator output pulses produced by conduction of transistors 65 and 71 are applied to the base-collector (77) junction of transistor 75. The collector 76 of this transistor provides a current supply for the voltage regulator 32. The current in the collector 77 of transistor 75 is controlled by the current in the comparators when they provide output pulses, which is controlled by the transistors 66 and 74. The current which is supplied to the voltage regulator 32 from collector 76 of transistor 75 will be essentially identical to that in collector 77, and is therefore controlled by the comparators 26 and 28.

The voltage regulator 32 includes a differential amplifier formed by transistors 80 and 81. Resistors 82 and 83 form a divider for applying a reference voltage to the base of transistor 80, and the base of transistor 81 is connected to the capacitor 34. The emitters of transistors 80 and 81 are connected through resistors 84 and 85 to the current supply provided by the collector 76 of transistor 75. The collectors of transistors 80 and 81 are connected to a differential to single ended converter circuit formed by transistor 86 and diode 87. The differential amplifier controls a switch circuit including transistors 88 and 90 for discharging the capacitor 34.

When current is supplied to the regulator differential amplifier from the collector 76 of transistor 75, and in the event that the capacitor 34 is charged to a higher voltage than the reference voltage applied to the base of transistor 80, transistor 80 will conduct more than transistor 81 and will supply base current to transistor 88. Transistor 88 will conduct to supply base current to transistor 90 to render the same conducting to rapidly discharge the capacitor 34. The regulator will remain operative for the time $\Delta t$ to hold capacitor 34 at the reference voltage E applied to the base of transistor 80 for a sufficient time to eliminate the dielectric storage in the capacitor.

The capacitor 34 which provides the timing ramp stabilizes the loop provided by the regulator. The comparators 36, 38 and 40 are shown in block diagram form in FIG. 2 as they can be of known construction. For example, these comparators can be of the construction described in U.S. Pat. No. 3,049,846, issued Mar. 14, 1972 Thomas M. Frederiksen. The comparator will provide outputs at times following the times $t_1$, $t_2$, etc. which depend upon the reference voltages 37 applied thereto. The reference voltages must be greater than the voltage E, and the time delays must be greater than $\Delta t$. In an application in an internal combustion engine, as referred to, time delays within the range from 3 to 250 milliseconds may be provided. However, the system described is not limited to use in providing time delays within this range.

The capacitor 34 and the resistor 35 which supplies charging current therefor are discrete devices so that they can be selected to provide the desired ramp rate. Reset capacitor 20 is also a discrete device. The other elements of FIG. 2, including the comparators 36, 38 and 40, can be provided as a single integrated circuit chip. The flip-flop 14 of FIG. 1 can also be provided on such chip.

As has been stated, the capacitor 34 and resistor 35 can be selected to have very small temperature coefficients, so that the time delays do not change substantially with temperature. The initial tolerances of these discrete components can also be very small to provide time delays accurate within 1 percent over a wide temperature range.

The time delay circuit has been found to be highly effective when used in an electronic fuel injection system for providing accurate timing of various operations required in such a system. The accuracy of the time delays following the times $t_1$ and $t_2$, which may occur at different points on the rotation of a shaft, are very precisely the same. This is because the same resistor-capacitor charging circuit, and the same comparators are used in both instances, and the switching of the regulator is accurately controlled to provide the same tuning in both cases. The time delays are also very closely the same from unit to unit because the timing pulses produced by the integrated circuit are of very short duration when compared with the time delays, so that errors in the pulse durations produce very small percentage errors in the time delays.

We claim:

1. A time delay generator including in combination, capacitor means, means connected to said capacitor means for charging the same to provide a ramp voltage thereacross which increases at a predetermined rate, a voltage regulator coupled to said capacitor means including reference means providing a fixed reference voltage, said regulator including a differential amplifier having a first input connected to said reference means and a second input connected to said capacitor means, and switch coupled to said differential amplifier and to said capacitor means and being selectively rendered operative by said differential amplifier to discharge said capacitor means to said fixed reference voltage;

control means coupled to said voltage regulator for causing the same to operate at recurring time intervals to discharge said capacitor means and to be inoperative between such intervals whereby said capacitor means charges to provide the ramp voltage, and comparator means coupled to said capacitor means and operative to produce an output signal in response to a voltage across said capacitor means which reaches a particular voltage above said reference voltage.

2. A time delay generator in accordance with claim 1 wherein said control means produces recurring pulses having fixed widths for rendering said voltage regulator operative for the duration of each pulse, with the duty cycle of said pulses being less than 50 percent.

3. A time delay generator in accordance with claim 2 wherein said pulses have a width to operate said voltage regulator for a sufficient time to eliminate the dielectric storage in said capacitor means.

4. A time delay generator in accordance with claim 1 wherein said comparator means includes a plurality of comparator cirucits, with each circuit being operative to provide an output signal in response to a different voltage across said capacitor means.

5. A time delay generator including in combination, capacitor means, means connected to said capacitor means for charging the same to provide a ramp voltage thereacross which increases at a predetermined rate, a voltage regulator coupled to said capacitor means including reference means providing a fixed reference voltage, said regulator being selectively rendered operative to discharge said capacitor means to said fixed reference voltage;

control means including switching means for producing recurring voltage changes, a reset capacitor, means coupled to said switching means for charging and discharging said reset capacitor at alternate voltage changes, and comparator circuit means coupled to said reset capacitor for producing pulses of substantially constant width which are initiated at said voltage changes, means coupling said comparator circuit means to said voltage regulator to apply said constant width pulses thereto to operate said regulator at recurring time intervals to discharge said capacitor means and to be inoperative between such intervals whereby said capacitor means charges to provide the ramp voltage, and comparator means coupled to said capacitor means and operative to produce an output signal in response to a voltage across said capacitor means which reaches a particular voltage above said reference voltage.

6. A time delay generator in accordance with claim 5 wherein said switching means produces a voltage which alternates between first and second levels in response to trigger signals applied thereto, said means coupled to said switching means charges said reset capacitor in response to said first voltage level and discharges said reset capacitor in response to said second voltage level, and said comparator circuit means includes first and second comparator circuits coupled to said reset capacitor, with said first comparator circuit producing a pulse in response to charge of said reset capacitor, and said second comparator circuit producing a pulse in response to discharge of said reset capacitor.

7. A time delay generator in accordance with claim 6 wherein said circuit means includes a first circuit connected to said reset capacitor for charging the same at a fixed rate, and a second circuit controlled by said switching means and connected to said reset capacitor for discharging the same at said fixed rate.

8. A time delay generator in accordance with claim 6 wherein said reset capacitor is charged to a fixed voltage level, and said comparator circuits are connected to said switching means and each has a reference input for receiving a reference voltage equal to one half said fixed voltage level, said first comparator producing a pulse initiated when said capacitor starts to charge and terminating when said capacitor charges to one half said fixed level, and said second comparator circuit producing a pulse initiated when said capacitor starts to discharge and terminated when said capacitor discharges to one half said fixed level.

9. A pulse generator for producing pulses of constant width in response to trigger signals, including in combination, switching means for producing a voltage which alternates between first and second levels in response to trigger signals applied thereto, capacitor means, circuit means coupled to said capacitor means and to said switching means for charging said capacitor means in response to said first voltage level and discharging said capacitor means in response to said second voltage level, and first and second comparator circuits coupled to said capacitor means, with said first comparator circuit producing a pulse of fixed width in response to charge of said capacitor means, and said second comparator producing a pulse of the same width in response to discharge of said capacitor means.

10. A pulse generator in accordance with claim 9 wherein said circuit means acts to charge said capacitor means to a fixed voltage level, and wherein said first and second comparator circuits are coupled to said switching means and are rendered operative thereby and each has a reference input for receiving a reference voltage equal to one half said fixed voltage level, said first comparator circuit being rendered operative by said switching means to produce a pulse initiated when said capacitor means starts to charge and terminating when said capacitor means charges to the reference voltage, and said second comparator circuit being rendered operative by said switching means to produce a pulse initiated when said capacitor means starts to discharge and terminating when said capacitor discharges to the reference voltage.

11. A pulse generator in accordance with claim 9 wherein said circuit means includes a first portion forming a charging path for applying fixed charging current to said capacitor means, a second portion for limiting the voltage across said capacitor means to a fixed level, and a third portion controlled by said switching means and selectively operated to form a discharge path for said capacitor means, said third portion conducting current which is equal to two times said fixed charging current whereby said discharge path conducts said charging current and additional current to discharge said capacitor means which is equal to said fixed charging current.

* * * * *